No. 715,229. Patented Dec. 2, 1902.
J. R. WINTERS.
CORN POPPER.
(Application filed Feb. 8, 1902.)
(No Model.)

WITNESSES:

INVENTOR
Jacob R. Winters.
BY Munn & Co.
ATTORNEYS

UNITED STATES PATENT OFFICE.

JACOB R. WINTERS, OF CLINTON, MISSOURI.

CORN-POPPER.

SPECIFICATION forming part of Letters Patent No. 715,229, dated December 2, 1902.

Application filed February 8, 1902. Serial No. 93,268. (No model.)

*To all whom it may concern:*

Be it known that I, JACOB R. WINTERS, a citizen of the United States, residing at Clinton, in the county of Henry and State of Missouri, have made certain new and useful Improvements in Corn-Poppers, of which the following is a specification.

My invention is an improvement in corn-poppers, and has for an object to provide a special construction of lid through which the small unpopped grains may be discharged after the popping operation has been completed to separate the popped from the unpopped corn; and the invention consists in certain novel constructions and combinations of parts, as will be hereinafter described and claimed.

Figure 1:
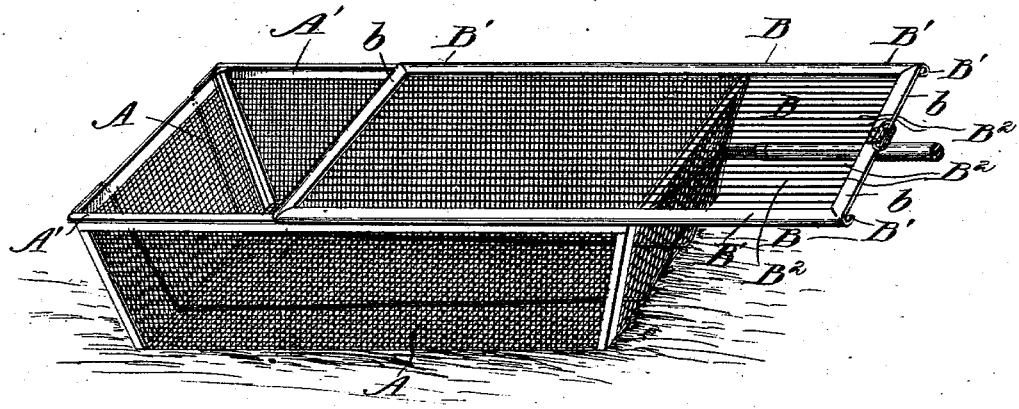
Figure 2:
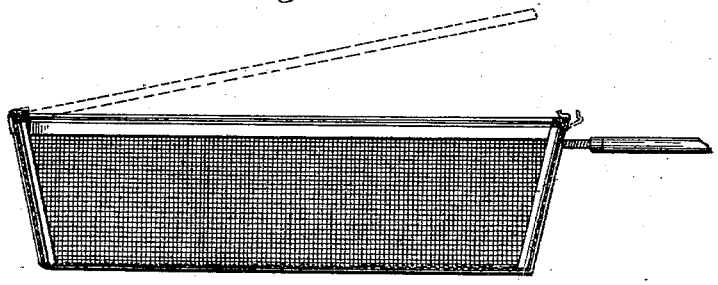

In the drawings, Figure 1 is a perspective view of my improved corn-popper, the lid or cover being partially opened; and Fig. 2 illustrates the construction when the lid is hinged.

Ordinarily the lids or covers of corn-poppers are made solid, and they are sometimes made of substantially the same mesh as the body A of the popper. By my invention I construct the lid or cover B of a suitable frame B' and wire strands B², which extend parallel within the frame B' and are spaced apart to such an extent that when the popper is turned upside down the small unpopped grains may be discharged between the wires B², while the popped corn will be retained in the popper. This is preferably effected by arranging the wires B longitudinally to extend between the end bars b of the frame B, and in operation after the corn has been popped the popper may be turned upside down and by shaking it slightly all the unpopped grains will be discharged through the lid, leaving the full popped grains in the popper.

In the construction shown in Fig. 1 the lid B is arranged to slide in suitable guides A' in the body of the popper; but manifestly the lid may be otherwise applied and may be arranged to turn on hinges, as shown in Fig. 2.

By my invention it will be noticed I am able to clean the popped corn and also to separate the burned unpopped grains from the corn that is popped out, as desired. Further, by employing the parallel wire strands extending longitudinally and spaced apart from end to end I avoid any clogging of the separating-lid and am able to thoroughly separate and discharge the unpopped grains after the popping operation has been completed.

The lid may be opened to introduce the corn, and after it has been popped the unpopped grains may be discharged through the lid and the lid be then opened to permit the withdrawal of the popped corn.

By the arrangement of the wires B² of the lid I provide longitudinally-extending discharge spaces or openings for the unpopped grains, such spaces being too narrow for the passage of the popped corn and being elongated, so they will not become clogged in discharging the unpopped corn.

It will be noticed from the drawings and the foregoing description that the lid or cover is slidable longitudinally in the guides of the body of the popper, also that the wire strands of the lid or cover extend in a direction parallel with the guides of the body and with the direction of movement of the cover in sliding the same from closed to open position. This is important and advantageous, as when the lid is constructed to slide and the strands are disposed longitudinally or in the direction of such sliding movement these strands will slide along the popped corn in opening the device without drawing the said corn between the cover and the body of the popper, which would tend to break the popped kernels.

Having thus described my invention, what I claim as new, and desire to secure by Letters Patent, is—

The corn-popper herein described comprising the body of wire mesh and open at one side and provided at such side with the longitudinal guides for the lid or cover, and the lid or cover having sliding engagement with said guides and composed of wire strands extending parallel with the longitudinal guides of the body and spaced apart in excess of the mesh of the body and to such extent as to permit the passage of the unpopped grains and prevent the passage of the popped grains and permitting the discharge from the popper of the unpopped grains through the lid or cover when the same is closed and which cover, when opened to permit the removal of the unpopped grains, will not operate to break the popped kernels by drawing the same between the cover and the body of the popper but will slide along said grains in adjusting to open position, substantially as and for the purposes set forth.

JACOB R. WINTERS.

Witnesses:
CHAS. E. CHEATHAM,
LULU WATKINS.